INVENTOR.
William E. VonKampen
BY
Charles R. White
ATTORNEY

United States Patent Office 3,401,575
Patented Sept. 17, 1968

3,401,575
TRANSMISSION CONTROL LINKAGE
William E. von Kampen, Mount Clemens, Mich., assignor to General Motors Corporation, Detroit, Mich., a corporation of Delaware
Filed Mar. 23, 1966, Ser. No. 536,838
12 Claims. (Cl. 74—473)

ABSTRACT OF THE DISCLOSURE

Shift control linkage in which the shifter tube carries roller pins which are selectively engageable with recesses in shift levers rotatably mounted on a support to drivingly connect the shifter tube and any selected shift lever.

---

This invention relates to transmission controls and more particularly to a transmission control having advanced clutching mechanisms for selectively connecting linkage members, which improves the shift pattern and which provides for increased service life of the linkage.

Change speed transmissions are generally controlled by the operator through a linkage system supported on the vehicle steering column. The linkage system includes a manual lever mounted adjacent to the steering wheel, convenient for manipulation by the operator. This lever is movable in an H pattern by the operator to move a shifter tube axially to couple selectively through key and keyway mechanisms either a first and reverse or second and third shifter lever and a shifter tube. Subsequent rotation of the manual lever in one direction by the operator shifts the transmission into one drive range, while rotation in an opposite direction shifts the transmission into another drive range. By rotating the shifter tube to a neutral position, the shifter tube can be moved in an axial direction to couple the other shifter lever to the shifter tube. This operation is generally referred to as a "crossover." Subsequent appropriate rotation of the shifter tube selects other ratios.

In the present invention there are provided roller pins and cooperating cylindrical keyways, providing selectively engageable clutching mechanisms, for connecting the shifter tube and shifter levers to smooth shift patterns and improve shift feel. These roller pins will tend to rock on their longitudinal axes during shifts thereby distributing wear over an increased area.

This invention further includes a novel arrangement of operator elements which enclose and protect the key and keyway as well as other internal parts of the transmission remote control linkage. These elements are mounted on the end of a shifter tube and are held in axial position by a bearing suitably held within the steering column and by a suitable adjusting mechanism which limits the axial play of the elements. Other features and advantages of this invention will appear from the following detailed description and the drawing in which.

Figure 1:
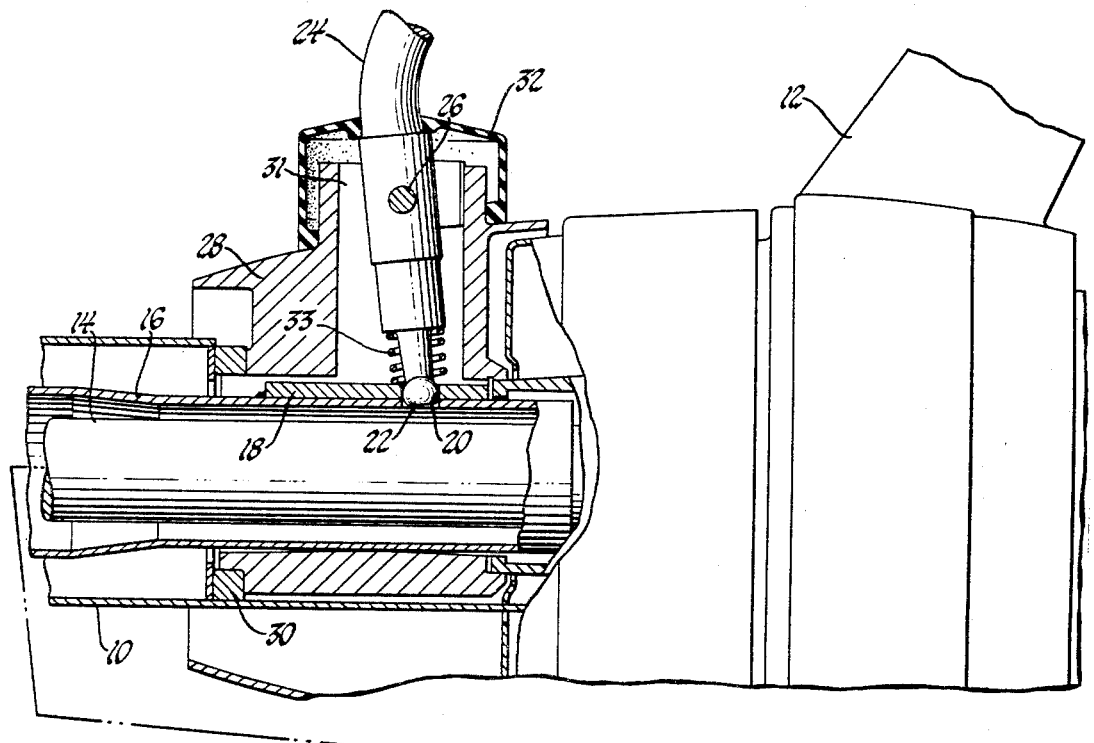
FIGURE 1 is a plan view of a steering column embodying the invention with parts broken away and in section.
Figure 1:
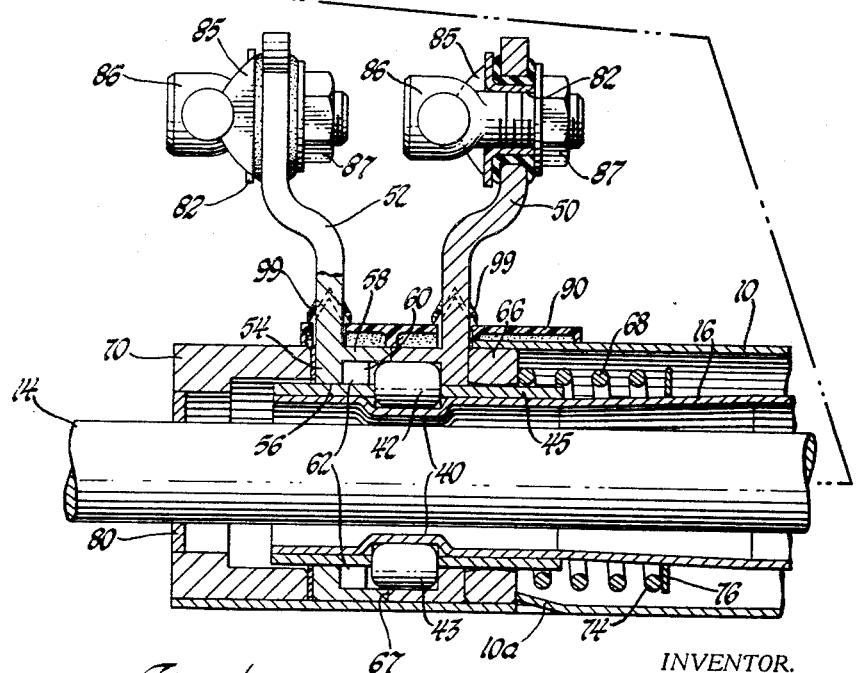

In FIGURE 1, a vehicle steering column 10 is conventionally supported in a vehicle frame, not illustrated, and has mounted at its upper end a steering wheel 12 that is secured in a suitable manner to a steering shaft 14. A shifter tube 16 supported within the steering column surrounds the steering shaft and has a curved plate 18 rigidly secured thereto. An opening 20 is formed in the plate and the shifter tube for reception of the ball end 22 of manual lever 24. The manual lever is pivoted by a pin 26 to a lever housing 28 mounted for limited rotation on column 10. As shown, the lever housing is rotatably mounted on bushing 30 secured in steering column 10. The lever 24, as shown, extends through an elongated opening 31 formed in the lever housing. Opening 31 is of sufficient length to permit the lever to be rocked on the pivot 26 and has a width which is slightly larger than the enlarged portion of the shifter lever near the pivot pin so that lever 24, housing 28, and tube 16 can be turned as a unit in either direction with respect to the longitudinal axis of the shifter tube. A coil spring 33 is positioned between plate 18 and lever 24 to take up any play. A suitable flexible cover 32 is provided for the housing 28 to seal the opening 31 and to provide a finished appearance.

By the mechanism described above, the shifter tube can be moved axially in either direction by the appropriate pivoting of lever 24 on pin 26 or turned on its axis by turning the lever in the appropriate direction.

The shifter tube extends substantially to the lower end of the steering column and, as shown, is formed with diametric indentations 40 to receive the generally cylindrical keys or roller pins 42 and 43. These roller pins preferably have radiused edges, as shown, to facilitate shifting feel since the keys are easily positioned in their keyways described below and shifting will not be confined to a rigid H pattern. The pins are located and retained on the shifter tube by a cylindrical sleeve 45 which has diametric rectangular openings therein to accommodate the pins. The sleeve 45 is securely fastened to the lower end of the shifter tube by spot-welds or other suitable means.

First and reverse and second and third shifter levers 50 and 52 are mounted on the sleeve 45 and extend through an opening in an end portion of the steering column. These levers are substantially identical, each having a body portion 54 formed with a circular opening 56 therein which receives the sleeve 45 so that the shifter tube may be turned relative to either lever. The body portion of each shifter lever has an annular extension 58 and a concentric, stepped shoulder 60. The shoulder has formed therein diametric concave keyways or recesses 62 to receive the portions of the roller pins which extend outwardly from sleeve 45. When the pins are in the recesses 62 in one shifter lever, they clear the corresponding recesses in the other lever so that only one shifter lever will be connected to the shifter tube at any one time. On rotation of the shifter tube, the roller pins will turn to a limited extent on their axes thus wearing evenly and having long service life. As illustrated, the shoulders 58 of the levers have flattened surfaces 67 which contact each other or are sufficiently closely adjacent to each other to restrict entry of foreign materials into the steering column.

Figure 2:
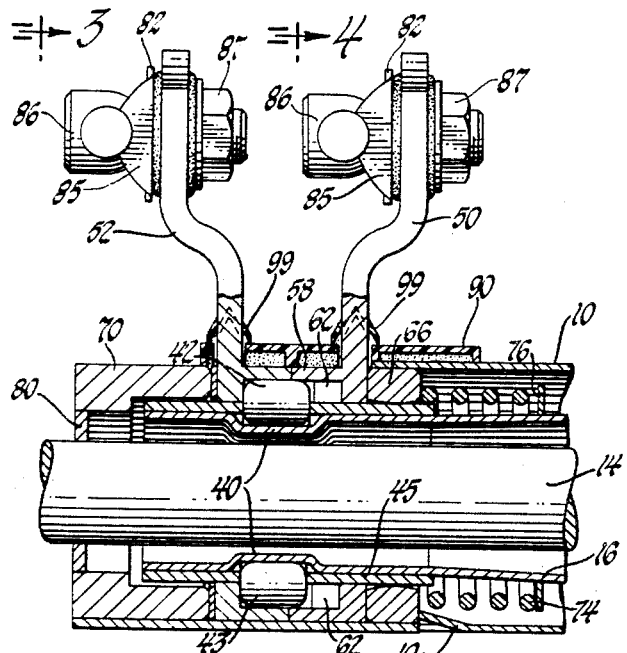
FIGURE 2 is a portion of FIGURE 1, showing an adjusted position of the invention.
Figure 2A:
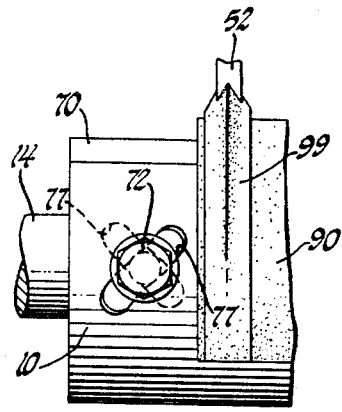
FIGURE 2a is a view along line 2a—2a of FIGURE 3.

A bearing 66 is positioned between the sleeve 45 and the column 10 and also contacts one side of the lever 50. The bearing is retained in position by tab 10a inwardly struck from column 10, the shifter levers and an adjustable bearing end ring 70 which is fastened to the column 10 by bolts 72. A coil spring 74 is positioned between the bearing 66 and the spaced washer 76 held by the taper of tube 16. This spring normally biases the shifter tube to the right toward the steering wheel 12 and biases the pins 42–43 into the recesses or keyways in lever 50 when aligned. As shown by FIGURE 2a, the column 10 has inclined slots 77 therein to permit the ring 70 to be rotated and adjusted relative to column 10 to take up end play of the levers 50 and 52. As illustrated, bushing 80 pressed into ring 70 closes the bottom of the column. It will be appreciated that the adjusting ring 70, the levers 50, 52 and bearing 66 cooperate to seal the end of the steering column, enclosing and protecting the mechanisms therein.

Figure 3:
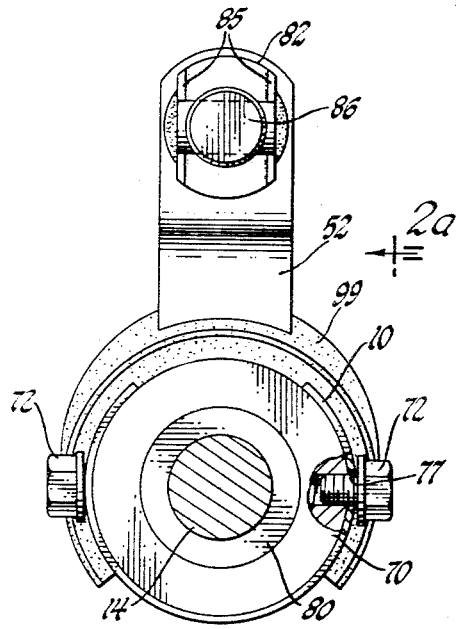
FIGURE 3 is a sectional view taken generally along the line 3—3 of FIGURE 2.
Figure 4:
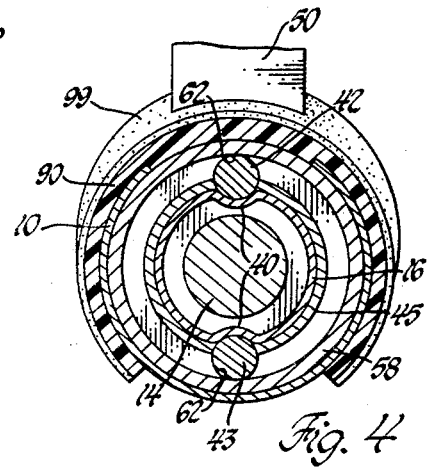
FIGURE 4 is a sectional view taken generally along line 4—4 of FIGURE 2.
Figure 5:
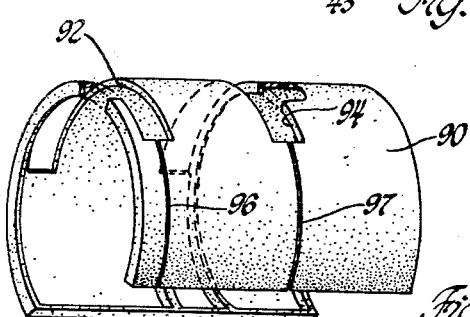
FIGURE 5 is an isometric view of a cover plate.

Each of the gear shift levers 50 and 52 have openings at their ends which receive the tubular body portion of clamping devices 82. These devices have a head and spaced saddles 85 as best shown in FIGURE 3. Suitable swivels 86 with an enlarged head portion and a threaded shank portion are mounted in these clamps. The head portion has an opening therein for reception of shifter rods, not shown, that connect into a transmission control arm which is also not shown. Nut assemblies 87 can be used to draw the swivels and the rods against the spaced saddles thereby coupling the rods to the shifter arms. Examples of such rods and their connection into a change-speed transmission may be found in the U.S. patents to Primeau 2,924,988 and G. C. Wilson et al. 3,080,769.

To further inhibit the entry of foreign materials into the lower end of the column 10, a curved lower jacket 90 of suitable flexible material, such as polyethylene, is secured to the column 10 by its own clamping action. This seal has elongated slots 92 and 94 through which the shifter levers 50 and 52 extend. This seal has slits 96 and 97 to facilitate installation on the steering column. Additionally, suitable lever seals 99 of polyethylene or other suitable materials are provided to seal slots 92 and 94. It will be appreciated that the lever seals will move with the levers 50 and 52 since the openings in the lever seals are only sufficient to accommodate the dimensions of the shifter levers.

From the above, assuming that the transmission is in neutral and first range is desired, the operator pivots the shifter lever clockwise in FIGURE 1 to move the shifter tube to the left against the bias of spring 68. The shift selector pin due to its end configuration will easily find the keyway 58 in the lever 52 while clearing the keyway in lever 50. First range may be selected by rotating the manual lever and shifter tube in a predetermined direction to rotate the lever 52 while reverse may be selected by rotating these elements in an opposite direction. When the shifter tube is moved to a neutral position, the transmission will be placed in neutral. Since the keyways in the arm 50 will be aligned with the shift roller pins, the spring will bias the shifter tube to move the roller pins into these keyways. Cross-over is completed when the keyways in the lever 52 are cleared. Second range is selected by rotating the manual lever, shifter tube, and connected shift lever in one direction, while third is selected by rotating these elements in an opposite direction.

From the above, it will be understood that with the disclosed construction the steering column is effectively sealed barring entry of dirt and other matter therein. This protects the mechanisms within the steering column from damage from such materials and thereby improves operation and length of service of this invention. The adjusting ring provided prevents looseness of the levers and premature cross-over. Shifting is smoother and shift feel is improved since shifting is not limited to an exact H pattern.

I claim:
1. In a transmission control linkage, a support, an actuator movably mounted with respect to said support, control members movably mounted with respect to said support, coupling means operatively connected to said actuator for selectively and drivingly connecting said actuator with any selected one of said control members in response to predetermined movement of said actuator, retainer means supported on said actuator for mounting said coupling means for movement with respect to said actuator in response to movement of said selected control member by further predetermined movement of said actuator, said control members and said actuator cooperating to enclose said coupling means.

2. The transmission control linkage of claim 1, including means mounting said actuator for rotational and axial movement in said support, and said retainer means mounting said coupling means on said actuator member closely adjacent the exterior thereof.

3. The transmission control linkage of claim 2, said coupling means being a generally cylindrical pin member.

4. The transmission control linkage of claim 3, said control members being formed by a pair of lever members each having an enlarged body portion and a laterally projecting arm, said support having an opening therein through which said arms extend, said body portions having extending annular portions which are closely adjacent for sealing the opening in said support, said body portions having a stepped shoulder portion concentric with said annular portion, each said stepped portion having a keyway therein, said keyways being of dimensions to receive said pin member, said pin member when fully engaged in the keyway in one member being of a dimension to clear the keyway in said other lever member.

5. The transmission control linkage of claim 4, and further including an end member for closing the bottom of said support and adjustably retaining said levers in said support, a bearing member mounted in said housing and contacting one side of one of said lever members, a spring mounted on said bearing, means on said actuator member for seating said spring, said spring being positioned to bias said control member in an axial direction.

6. The transmission control linkage of claim 4, including a flexible seal mounted on said support and having openings therein to accommodate said arms of said levers and further including seals carried by each of said arms to seal the openings in said flexible seal.

7. The transmission control linkage of claim 5, said actuator member being an elongated shift tube, said shift tube having an indentation to receive said pin member, means secured to said shift tube to retain said pin member thereon, said bearing portion of said shifter levers retaining said pin member in radial position.

8. The transmission control linkage of claim 7, wherein said means secured to said actuator for retaining said pin member thereon is an annular sleeve having an opening therein to accommodate said pin member.

9. The transmission control linkage of claim 7, wherein said end member, said body portions of said arms, and said bearing substantially seal said support from entry of materials into said support.

10. The transmission control linkage of claim 7, wherein said pin member has radiused end portions to facilitate connection of said shifter tube to either of said shifter levers, said pin member turning on its longitudinal axis when either of said levers is turned by operation of said shifter tube.

11. In a transmission control linkage, a support, an actuator movably mounted with respect to said support, control members movably mounted on said support, coupling means operated by said actuator for selectively connecting any of said control members to said actuator for movement therewith, said coupling means including key means mounted on said actuator and mounted for limited rotation with respect to said actuator when one of said control members is moved in response to movement of said actuator in a predetermined direction.

12. The transmission control linkage of claim 11, said key means being first and second cylindrical roller pins, a sleeve secured to said actuator for supporting said roller pins on said actuator, and each of said control members having a pair of cylindrical openings providing keyways for said roller pins.

References Cited

UNITED STATES PATENTS

| | | | |
|---|---|---|---|
| 2,631,467 | 3/1953 | Lincoln et al. | 74—484 |
| 2,992,548 | 7/1961 | Müller et al. | 64—23 |
| 3,025,714 | 3/1962 | Bliss | 74—473 XR |
| 3,025,715 | 3/1962 | Grady | 74—484 |
| 3,121,344 | 2/1964 | Fodrea | 74—473 |

C. J. HUSAR, *Primary Examiner.*